United States Patent
Nakamura

(10) Patent No.: US 10,246,071 B2
(45) Date of Patent: Apr. 2, 2019

(54) HYDRAULIC PRESSURE GENERATING DEVICE

(71) Applicant: AUTOLIV NISSIN BRAKE SYSTEMS JAPAN CO., LTD., Ueda, Nagano (JP)

(72) Inventor: Motoyasu Nakamura, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 15/471,197

(22) Filed: Mar. 28, 2017

(65) Prior Publication Data

US 2017/0282880 A1      Oct. 5, 2017

(30) Foreign Application Priority Data

Mar. 30, 2016   (JP) .................................. 2016-069579

(51) Int. Cl.
  *B60T 13/74*   (2006.01)
  *B60T 11/16*   (2006.01)
  *B60T 11/22*   (2006.01)
  *B60T 13/68*   (2006.01)
  *B60T 8/36*    (2006.01)
  *B60T 8/40*    (2006.01)

(52) U.S. Cl.
  CPC ............ *B60T 13/745* (2013.01); *B60T 8/368* (2013.01); *B60T 11/165* (2013.01); *B60T 11/22* (2013.01); *B60T 13/686* (2013.01); *B60T 8/4081* (2013.01); *B60T 2220/04* (2013.01)

(58) Field of Classification Search
  CPC ...... B60T 8/368; B60T 8/4031; B60T 13/745; B60T 2220/04
  See application file for complete search history.

(56) References Cited

U.S. PATENT DOCUMENTS 7,325,658 B2 *   2/2008  Halasy-Wimmer ........................ B60T 13/741
                                                                   188/158
9,365,199 B2 *   6/2016  Drumm ................. B60T 8/3655
(Continued)

FOREIGN PATENT DOCUMENTS

EP      2881292      6/2015
JP      2012210879   11/2012
WO      2014124925   8/2014

OTHER PUBLICATIONS

European Search Report for EP Application No. 17163550.1-1762 dated Jul. 24, 2017, 9 pages.

*Primary Examiner* — Bradley T King
(74) *Attorney, Agent, or Firm* — Andrew M. Calderon; Roberts, Mlotkowski Safran Cole & Calderon, P.C.

(57) ABSTRACT

A hydraulic pressure generating device includes a base body, a master cylinder provided on the base body and configured to generate a brake hydraulic pressure by a first piston connected to a brake operating element, a housing attached to the base body, a control board contained in the housing, a stroke sensor configured to detect an amount of movement of the first piston; and a detection object member which is detected by the stroke sensor. The housing has a facing wall portion provided so as to face the base body. The stroke sensor is provided inside the housing on the opposite side of the facing wall portion to the base body, and is electrically connected to the control board.

18 Claims, 10 Drawing Sheets

(56) References Cited

U.S. PATENT DOCUMENTS

| | | | |
|---|---|---|---|
| 9,566,969 B2* | 2/2017 | Linhoff | B60T 7/042 |
| 2014/0216866 A1 | 8/2014 | Feigel et al. | |
| 2015/0059334 A1* | 3/2015 | Nakamura | B60T 13/662 |
| | | | 60/545 |
| 2015/0070003 A1* | 3/2015 | Elliott | B60T 8/368 |
| | | | 324/207.15 |
| 2015/0158466 A1* | 6/2015 | Nakamura | B60T 11/16 |
| | | | 303/3 |
| 2015/0166030 A1* | 6/2015 | Kobayashi | B60T 13/58 |
| | | | 303/14 |
| 2016/0016567 A1 | 1/2016 | Jürgens | |
| 2017/0021813 A1* | 1/2017 | Tandler | B60T 8/368 |
| 2017/0182992 A1* | 6/2017 | Matsunaga | B60T 13/142 |
| 2017/0190328 A1* | 7/2017 | Nakazawa | B60T 8/368 |

* cited by examiner

HYDRAULIC PRESSURE GENERATING DEVICE

CROSS-REFERENCE TO RELATED APPLICATION

The present application claims priority under 35 U.S.C. § 119 to Japanese Patent Application No. 2016-069579, filed Mar. 30, 2016. The contents of this application are incorporated herein by reference in their entirety.

The present invention relates to a hydraulic pressure generating device usable in a brake system for a vehicle.

In the related art, as a hydraulic pressure generating device usable in a brake system for a vehicle, a hydraulic pressure generating device including a master cylinder for generating a brake hydraulic pressure in response to the amount of operation on a brake operating element is known (see Japanese Patent Application Laid-Open No. 2012-210879 for instance).

In a master cylinder device (a hydraulic pressure generating device) disclosed in Japanese Patent Application Laid-Open No. 2012-210879, the brake operating element is connected to a stroke sensor. The stroke sensor detects an actual stroke amount (the amount of depression of the brake operating element from its origin position) as the amount of operation. The detected operation amount is converted into an electric signal, which is output to other devices such as a motor cylinder device (a slave cylinder) for generating a brake hydraulic pressure by a piston using a motor as its driving source.

In the above-described hydraulic pressure generating device disclosed in Japanese Patent Application Laid-Open No. 2012-210879, since the stroke sensor is connected to the brake operating element, it is required to secure a space for mounting the stroke sensor in a vehicle. Also, since the stroke sensor is installed outside the hydraulic pressure generating device, it is required to protect the stroke sensor from the outside such that it is possible to secure reliability.

The present invention was made in view of the above-described circumstances, and an object of the present invention is to provide a hydraulic pressure generating device making it easier to secure a space for mounting the hydraulic pressure generating device in a vehicle and capable of protecting a stroke sensor.

A hydraulic pressure generating device according to the present invention may include a base body, and a master cylinder provided on the base body and configured to generate a brake hydraulic pressure by a first piston connected to a brake operating element. Also, the hydraulic pressure generating device may include a housing attached to the base body, and a control board contained in the housing. Further, the hydraulic pressure generating device may include a stroke sensor configured to detect the amount of movement of the first piston, and a detection object member which is detected by the stroke sensor. Also, the housing has a facing wall portion may be provided so as to face the base body. The stroke sensor may be provided inside the housing on the opposite side of the facing wall portion to the base body, and is electrically connected to the control board.

The hydraulic pressure generating device can detect an input attributable to an operator's operation on a brake by the stroke sensor contained in the housing. Also, a signal detected by the stroke sensor is input directly to the control board. As described above, the stroke sensor is contained in the housing attached to the base body. Therefore, it becomes possible to reduce the size of the base body even though the stroke sensor is included, and it is possible to achieve an advantage that it is easy to secure a space for mounting the hydraulic pressure generating device on a vehicle.

Also, since a portion of the stroke sensor positioned on the base body side is covered by the facing wall portion, for example, during maintenance, when a worker attaches or detaches the housing to or from the base body, it is possible to suppress the fingers of the worker from touching the stroke sensor, other components, and so on. Further, it is possible to suppress entry of external foreign materials by the facing wall portion, and it is possible to provide a dust proofing function. Since the stroke sensor is protected by the facing wall portion as described above, it is possible to secure detection accuracy and durability, and it is possible to improve reliability.

In other words, according to this invention, it is possible to provide the hydraulic pressure generating device making it easier to secure a space for mounting the hydraulic pressure generating device on a vehicle and capable of protecting the stroke sensor.

Besides, since the hydraulic pressure generating device includes the stroke sensor, as compared to a case where the stroke sensor is configured separately from the hydraulic pressure generating device, it is unnecessary to separately provide the stroke sensor and form signal lines. For this reason, assembling man-hours when the hydraulic pressure generating device is mounted on a vehicle decrease, and the number of components decreases. Therefore, it is possible to reduce the manufacturing cost.

In the above-described hydraulic pressure generating device, the stroke sensor may include a detection element configured to detect the detection object member, and a sensor board having the detection element thereon, and inside the housing, a conductive member may be installed so as to connect the sensor board and the control board. Here, the sensor board may be fixed to the conductive member.

According to this configuration, since it is possible to fix the sensor board by the conductive member, the stroke sensor does not need to be contained, for example, inside a resin mold component, and also does not need connectors for connection. Therefore, the configuration of the stroke sensor is simplified, and the cost decreases.

In the above-described hydraulic pressure generating device, in a state where a male terminal provided on one of the sensor board and an end portion of the conductive member positioned on the sensor board side is inserted in a female terminal provided on the other, the sensor board may be fixed to the conductive member.

According to this configuration, since the male terminal is inserted into the female terminal, it is possible to fix the sensor board, for example, by pressing (for example, press fitting).

In the above-described hydraulic pressure generating device, a portion of the conductive member may be buried in the facing wall portion of the housing.

According to this configuration, it is possible to stably and securely fix the conductive member to the housing by the facing wall portion. As a result, the male terminal provided at the end portion of the conductive member is precisely positioned. Therefore, it becomes easier to connect the sensor board to the male terminal of the conductive member, and the electrical connection of the conductive member with the sensor board becomes securer.

In the above-described hydraulic pressure generating device, a plurality of solenoid valves may be attached to a surface of the base body to which the housing is attached, and the extension direction of an end portion of the conduction member positioned on the sensor board side may be disposed in parallel to the central axes of the solenoid valves.

According to this configuration, it is possible to move the sensor board of the stroke sensor in the same direction as the direction in which the solenoid valves V are attached to the base body, and connect the sensor board to the end portion of the conductive member positioned on the sensor board side. Therefore, it is possible to efficiently install the stroke sensor.

In the above-described hydraulic pressure generating device, the end portion of the conductive member positioned on the sensor board side may extend in a direction from the base body toward the control board and be connected to the sensor board.

According to this configuration, it is possible to move the sensor board of the stroke sensor in the same direction as a direction in which the control board is attached to the inside of the housing, and connect the sensor board to the end portion of the conductive member positioned on the sensor board side. Therefore, it is possible to efficiently install the stroke sensor.

In the above-described hydraulic pressure generating device, the housing may have a surrounding wall protruding from the facing wall portion and surrounding the stroke sensor.

According to this configuration, the stroke sensor is covered and protected by the facing wall portion and the surrounding wall. Therefore, it is possible to further improve the reliability of the stroke sensor.

In the above-described hydraulic pressure generating device, the stroke sensor may be fixed to the housing.

According to this configuration, it is possible to securely prevent the stroke sensor from unexpectedly moving. Therefore, it is possible to further improve the reliability of the stroke sensor.

In the above-described hydraulic pressure generating device, the stroke sensor may be buried in a resin fixed on the facing wall portion of the housing.

According to this configuration, it is possible to easily and securely fix the stroke sensor to the housing, and since the whole of the stroke sensor is covered by the resin, the stroke sensor is more securely protected.

The above-described hydraulic pressure generating device may further include a motor attached to the base body, and a slave cylinder provided on the base body and using the motor as its driving source and configured to generate a hydraulic pressure by a second piston. Here, the base body has a first cylinder bore with a bottom in which the first piston is inserted, and a second cylinder bore with a bottom in which the second piston is inserted. Also, the axial line of the first cylinder bore, the axial line of the second cylinder bore, and the axial line of an output shaft of the motor are disposed in parallel. Further, below the first cylinder bore, the second cylinder bore and the motor are disposed on the left and right of a vertical reference plane including the axial line of the first cylinder bore. Furthermore, the housing and the slave cylinder are disposed side by side in a vertical direction.

According to this configuration, since the master cylinder, the slave cylinder and the motor are disposed with good balance, it is possible to reduce the size of the hydraulic pressure generating device, and since the heavy motor is disposed at a lower portion, it is possible to improve the stability of the hydraulic pressure generating device. Also, since it is possible to dispose the housing while effectively using a space around the base body, it is possible to further reduce the size of the hydraulic pressure generating device. Therefore, it becomes easier to secure a space for mounting the hydraulic pressure generating device on a vehicle.

According to the present invention, it is possible to provide a hydraulic pressure generating device making it easier to secure a space for mounting the hydraulic pressure generating device in a vehicle and capable of protecting a stroke sensor.

An embodiment of the present invention will be described in detail, appropriately with reference to the accompanying drawings.

In the present embodiment, a case of applying a hydraulic pressure generating device of the present invention to a brake system for a vehicle will be described as an example.

Figure 1:
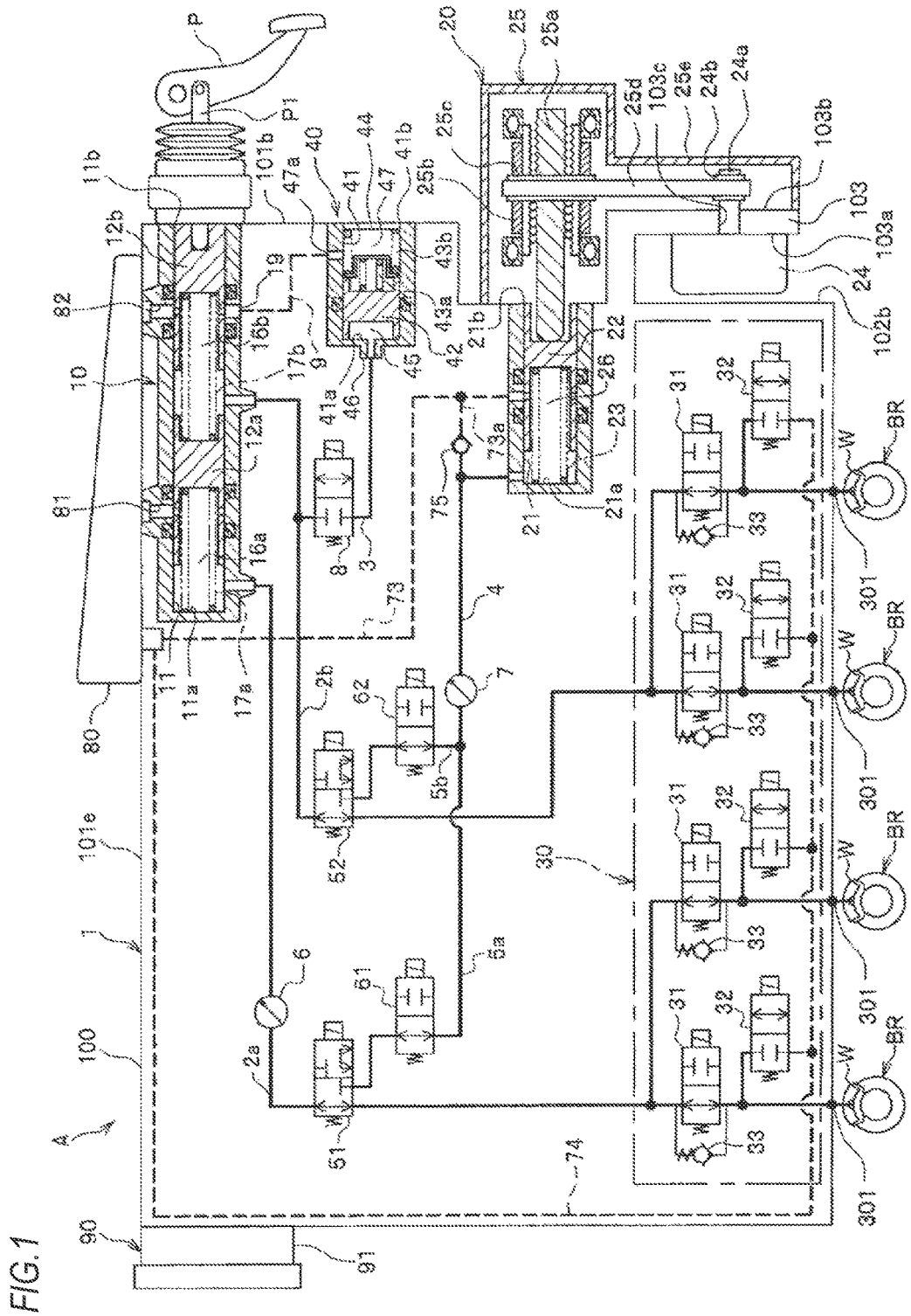
FIG. 1 is a view illustrating the overall configuration of a brake system for a vehicle using a hydraulic pressure generating device of an embodiment.

As shown in FIG. 1, a brake system A for a vehicle includes both of a brake-by-wire type brake system configured to operate during activation of a power source (such as an engine or an electric motor) and a hydraulic type brake system configured to operate during stop of the power source or the like.

The brake system A for a vehicle can be mounted on a hybrid vehicle using both of an engine and a motor, an electric vehicle or a fuel cell vehicle using only a motor as a power source, or a vehicle using only an engine (an internal combustion engine) as a power source.

The brake system A for a vehicle includes a hydraulic pressure generating device 1 which generates a brake hydraulic pressure in response to the stroke amount (operation amount) of a brake pedal P (corresponding to a "brake operating element" of claims) and assists stabilization of motion of a vehicle.

The hydraulic pressure generating device 1 includes a base body 100, a master cylinder 10 configured to generate a brake hydraulic pressure in response to the stroke amount of the brake pedal P, a stroke simulator 40 configured to apply a pseudo operation reaction force to the brake pedal P, and a slave cylinder 20 configured to use a motor 24 as a driving source and generate a brake hydraulic pressure. Further, the hydraulic pressure generating device 1 includes a hydraulic pressure control device 30 configured to control the hydraulic pressure of brake fluid to act on wheel cylinders W of wheel brakes BR, thereby assisting stabilization of motion of a vehicle, an electronic control device 90, and a reservoir tank 80.

Also, in the following description, directions are directions set in order to facilitate a description of the hydraulic pressure generating device 1, and substantially coincide with the directions of the hydraulic pressure generating device 1 as seen in a state where it is mounted on a vehicle. In other words, a direction toward which a rod P1 moves when the brake pedal P is depressed is referred to as the front side (the front end side), and a direction toward which the rod P1 moves when the brake pedal P returns to its original position is referred to as the rear side (the rear end side) (see FIG. 2). Further, a horizontal direction perpendicular to the movement direction (front-rear direction) of the rod P1 is referred to as the left-right direction (see FIG. 2).

Figure 3:
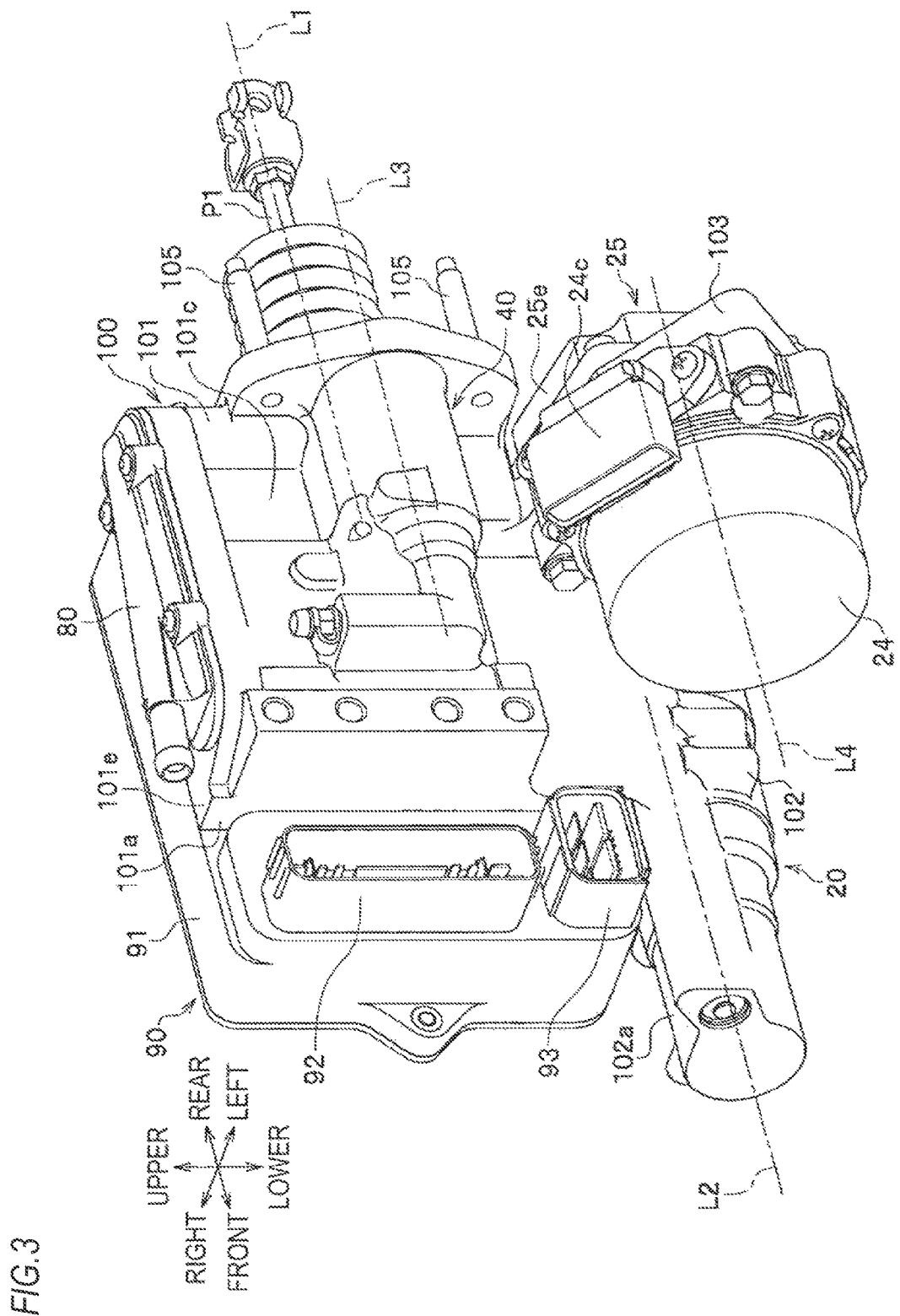
FIG. 3 is a perspective view of the hydraulic pressure generating device of the embodiment as seen from the front side of the left upper side.

The base body 100 is a metal block to be mounted on a vehicle (see FIG. 3). In the base body 100, three cylinder bores 11, 21, and 41 and a plurality of hydraulic passages 2a, 2b, 3, 4, 5a, 5b, 73, 74, and the like are formed. Also, on the base body 100, various components such as the reservoir tank 80 and the motor 24 are attached.

Figure 7:
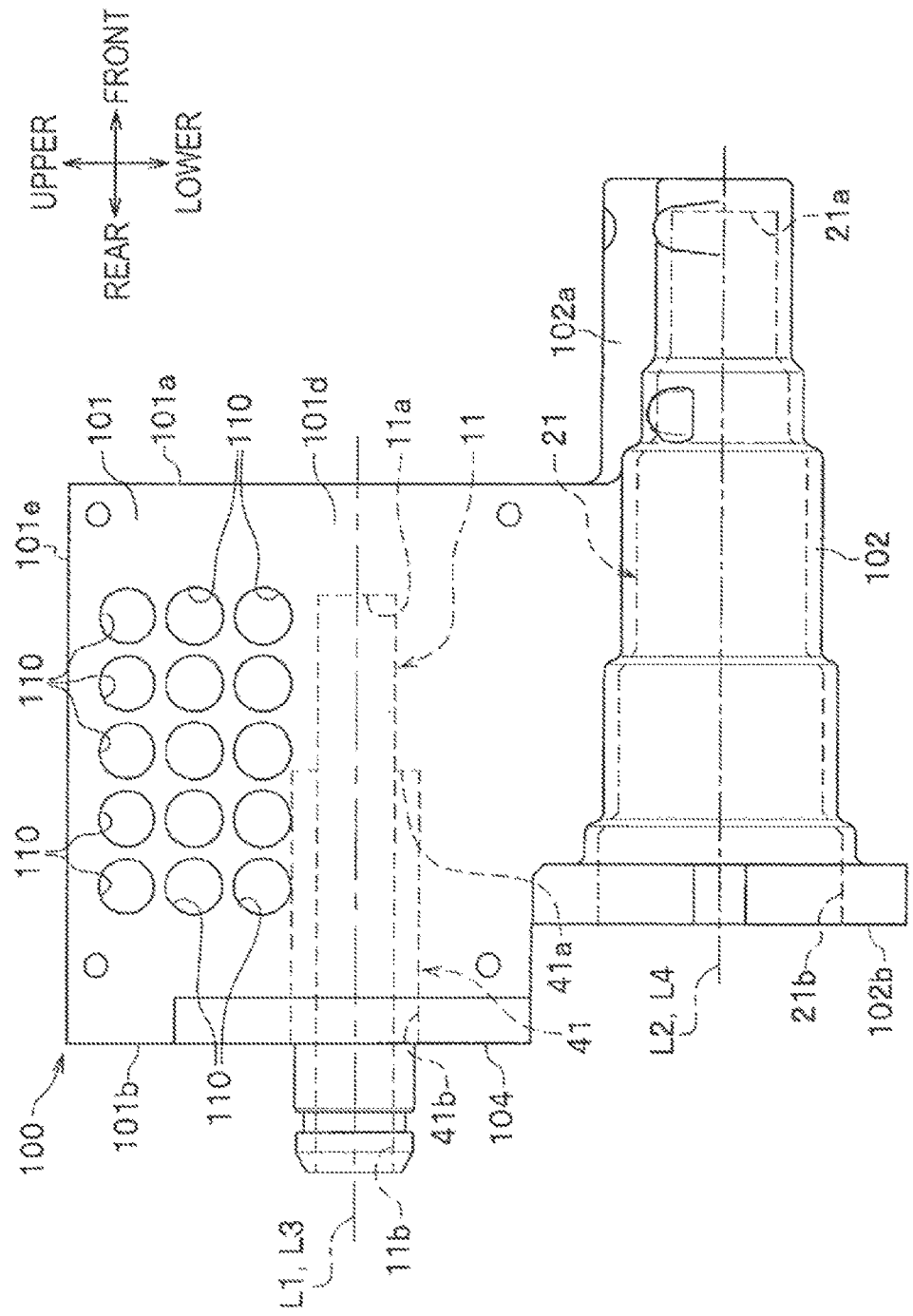
FIG. 7 is a right side view illustrating the base body of the hydraulic pressure generating device of the embodiment.

In the base body 100, as shown in FIG. 7, the first cylinder bore 11, the second cylinder bore 21, and the third cylinder bore 41 are formed in a cylindrical shape with a bottom. Each of the cylinder bores 11, 21, and 41 extends in the front-rear direction, and axial lines L1, L2, and L3 of the cylinder bores 11, 21, and 41 are disposed side by side in parallel to one another. Also, the rear end portions of the cylinder bores 11, 21, and 41 are formed in rear surfaces 101b and 102b of the base body 100.

As shown in FIG. 1, the master cylinder 10 is a tandem piston type, and includes two first pistons 12b and 12b (a secondary piston and a primary piston) inserted in the first cylinder bore 11, and two coil springs 17b and 17b contained in the first cylinder bore 11.

Between a bottom surface 11a of the first cylinder bore 11 and the first piston 12a (the secondary piston) positioned on the bottom side, a bottom side pressure chamber 16a is formed. The bottom side pressure chamber 16a contains the coil spring 17a. If the first piston 12a moves toward the bottom surface 11a, the coil spring 17a pushes the first piston back toward an opening 11b.

Between the first piston 12a positioned on the bottom side and the first piston 12b (the primary piston) positioned on the opening side, an opening side pressure chamber 16b is formed. Also, the opening side pressure chamber 16b contains the coil spring 17b. If the first piston 12b moves toward the bottom surface 11a, the coil spring 17b pushes the first piston back toward the opening 11b.

The rod P1 of the brake pedal P is inserted in the first cylinder bore 11. The leading end portion of the rod P1 is connected to the first piston 12b positioned on the opening side. As a result, the first piston 12b positioned on the opening side is connected to the brake pedal P by the rod P1.

The two first pistons 12a and 12b slide inside the first cylinder bore 11 in response to a depression force on the brake pedal P, thereby pressing the brake fluid contained in the bottom side pressure chamber 16a and the opening side pressure chamber 16b.

Figure 2:
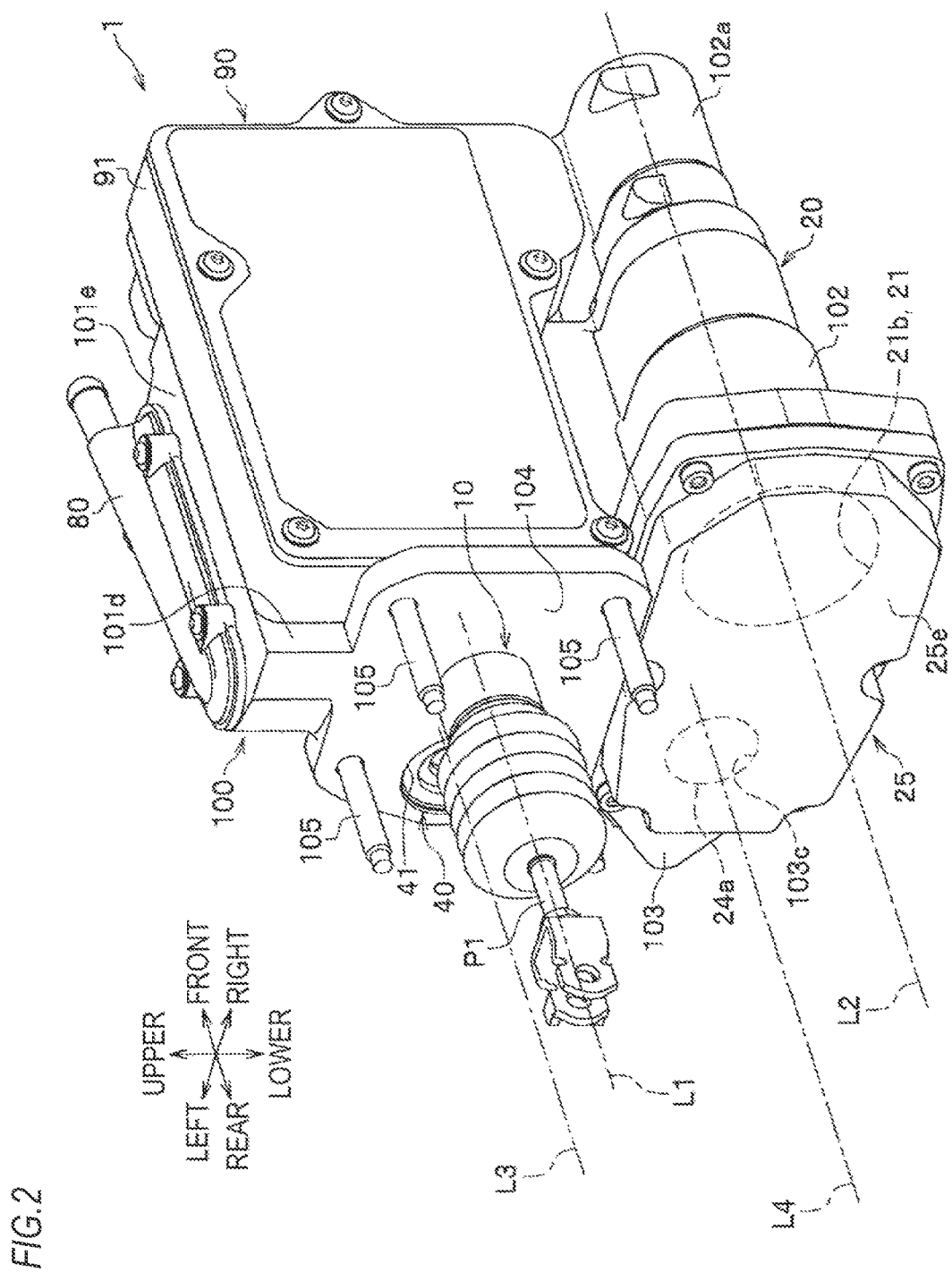
FIG. 2 is a perspective view of the hydraulic pressure generating device of the embodiment as seen from the rear side of the right upper side.

The reservoir tank 80 is a reservoir for storing the brake fluid, and is attached to an upper surface 101e of the base body 100 (see FIG. 2). Two fluid supply parts protruding from the lower surface of the reservoir tank 80 are inserted in two reservoir union ports 81 and 82 formed in the upper surface 101e of the base body 100. The brake fluid is supplied from the reservoir tank 80 into the bottom side pressure chamber 16a and the opening side pressure chamber 16b through the reservoir union ports 81 and 82.

The stroke simulator 40 includes a third piston 42 inserted in the third cylinder bore 41, a lid member 44 configured to block an opening 41b of the third cylinder bore 41, and two coil springs 43a and 43b contained between the third piston 42 and the lid member 44.

Between a bottom surface 41a of the third cylinder bore 41 and the third piston 42, a pressure chamber 45 is formed. The pressure chamber 45 formed inside the third cylinder bore 41 is connected to the opening side pressure chamber 16b of the first cylinder bore 11 by a hydraulic branch passage 3 and the second main hydraulic passage 2b to be described below.

In the stroke simulator 40, the brake hydraulic pressure generated in the opening side pressure chamber 16b of the master cylinder 10 causes the third piston 42 of the stroke simulator 40 to move against the biasing forces of the coil springs 43a and 43b, whereby the biased third piston 42 applies a pseudo operation reaction force to the brake pedal P.

The slave cylinder 20 is a single piston type, and includes a second piston 22 inserted in the second cylinder bore 21, a coil spring 23 contained in the second cylinder bore 21, the motor 24, and a drive transmission unit 25.

Between a bottom surface 21a of the second cylinder bore 21 and the second piston 22, a pressure chamber 26 is formed. Also, the pressure chamber 26 contains the coil spring 23. If the second piston 22 moves toward the bottom surface 21a, the coil spring 23 pushes the second piston back toward an opening 21b.

The motor 24 is an electric servo motor which is driven and controlled by the electronic control device 90 to be described below. From the central portion of the rear surface of the motor 24, an output shaft 24a protrudes toward the rear side.

Figure 4:
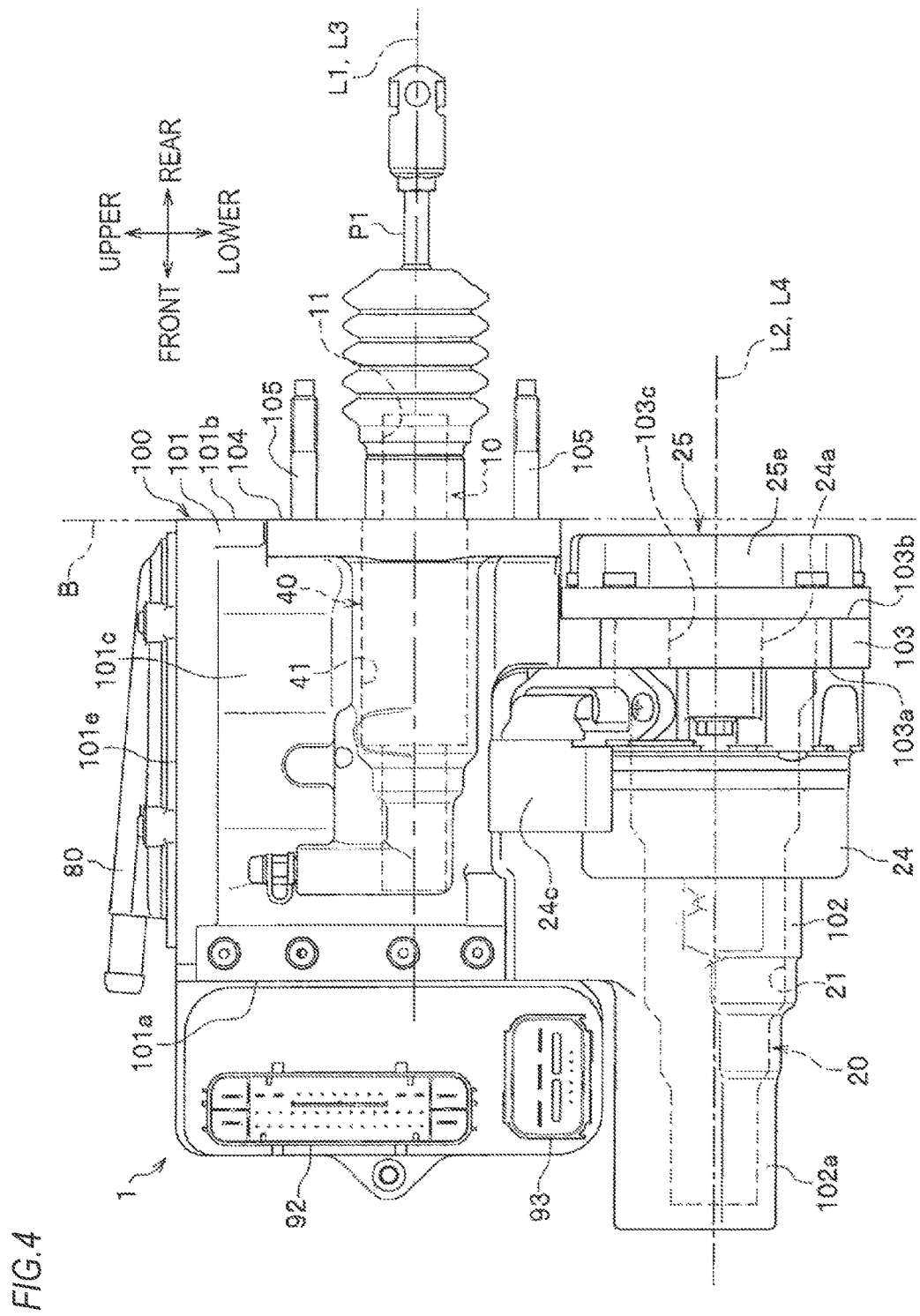
FIG. 4 is a left side view illustrating the hydraulic pressure generating device of the embodiment.

The motor 24 is attached to the front surface of a flange portion 103 of the base body 100 (see FIG. 4). The output shaft 24a protrudes from the rear side of the flange portion 103 through a through-hole 103c formed in the flange portion 103. On the rear end portion of the output shaft 24a, a driving pulley 24b is fit.

The drive transmission unit 25 is a mechanism for converting a rotation drive force of the output shaft 24a of the motor 24 into an axial force of a straight line direction.

The drive transmission unit 25 includes a rod 25a, a cylindrical nut member 25b fit on the rod 25a, a driven pulley 25c fit on the nut member 25b, an endless belt 25d suspended between the driven pulley 25c and the driving pulley 24b, and a cover member 25e.

The rod 25a is inserted from the opening 21b of the second cylinder bore 21 into the second cylinder bore 21, such that the front end portion of the rod 25a comes into contact with the second piston 22. The rear portion of the rod 25a protrudes from the rear surface 102b of the base body 100 toward the rear side.

Between the outer circumferential surface of the rear portion of the rod 25a and the inner circumferential surface of the nut member 25b, a ball screw mechanism is provided. Also, the nut member 25b is supported on the base body 100 with a bearing interposed therebetween.

If the output shaft 24a rotates, the rotation drive force of the output shaft is input to the nut member 25b by the driving pulley 24b, the belt 25d, and the driven pulley 25c. Then, the ball screw mechanism provided between the nut member 25b and the rod 25a applies the axial force of the straight line direction to the rod 25*a*, whereby the rod 25*a* moves forward and backward in the front-rear direction.

When the rod 25*a* moves forward, the second piston 22 slides inside the second cylinder bore 21 in response to the input from the rod 25*a*, thereby pressing the brake fluid contained in the pressure chamber 26.

Now, the hydraulic passages formed in the base body 100 will be described.

As shown in FIG. 1, two main hydraulic passages 2*a* and 2*b* are hydraulic passages starting from the first cylinder bore 11 of the master cylinder 10.

The first main hydraulic passage 2*a* extends from the bottom side pressure chamber 16*a* of the master cylinder 10 to two wheel brakes BR and BR through the hydraulic pressure control device 30.

The second main hydraulic passage 2*b* extends from the opening side pressure chamber 16*b* of the master cylinder 10 to the other two wheel brakes BR and BR through the hydraulic pressure control device 30.

The hydraulic branch passage 3 is a hydraulic passage extending from the pressure chamber 45 of the stroke simulator 40 to the second main hydraulic passage 2*b*. On the hydraulic branch passage 3, a normally closed type solenoid valve 8 is provided. The normally closed type solenoid valve 8 is for opening or closing the hydraulic branch passage 3.

Two connection passages 5*a* and 5*b* start from the second cylinder bore 21 of the slave cylinder 20. The two connection passages 5*a* and 5*b* are connected to the second cylinder bore 21 by a common hydraulic passage 4.

The first connection passage 5*a* is a flow passage extending from the pressure chamber 26 formed inside the second cylinder bore 21 to the first main hydraulic passage 2*a*, and the second connection passage 5*b* is a flow passage extending from the pressure chamber 26 to the second main hydraulic passage 2*b*.

On the connection part of the first main hydraulic passage 2*a* and the first connection passage 5*a*, a first changeover valve 51 which is a three-way valve is provided. The first changeover valve 51 is a two-position three-port type solenoid valve.

When the first changeover valve 51 is at a first position shown in FIG. 1, the upstream side of the first main hydraulic passage 2*a* (close to the master cylinder 10) and the downstream side thereof (close to the wheel brakes BR) are connected, and the first main hydraulic passage 2*a* and the first connection passage 5*a* are disconnected.

When the first changeover valve 51 is at a second position, the upstream side and downstream side of the first main hydraulic passage 2*a* are disconnected, and the first connection passage 5*a* and the downstream side of the first main hydraulic passage 2*a* are connected.

On the connection portion of the second main hydraulic passage 2*b* and the second connection passage 5*b*, a second changeover valve 52 which is a three-way valve is provided. The second changeover valve 52 is a two-position three-port type solenoid valve.

When the second changeover valve 52 is at a first position shown in FIG. 1, the upstream side of the second main hydraulic passage 2*b* (close to the master cylinder 10) and the downstream side thereof (close to the wheel brakes BR) are connected, and the second main hydraulic passage 2*b* and the second connection passage 5*b* are disconnected.

When the second changeover valve 52 is at a second position, the upstream side and downstream side of the second main hydraulic passage 2*b* are disconnected, and the second connection passage 5*b* and the downstream side of the second main hydraulic passage 2*b* are connected.

On the first connection passage 5*a*, a first shutoff valve 61 is provided. The first shutoff valve 61 is a normally open type solenoid valve. If electric power is supplied to the first shutoff valve 61, whereby the first shutoff valve is closed, the first connection passage 5*a* is blocked by the first shutoff valve 61.

On the second connection passage 5*b*, a second shutoff valve 62 is provided. The second shutoff valve 62 is a normally open type solenoid valve. If electric power is supplied to the second shutoff valve 62, whereby the second shutoff valve is closed, the second connection passage 5*b* is blocked by the second shutoff valve 62.

Two pressure sensors 6 and 7 are for detecting the magnitude of the brake hydraulic pressure, and information acquired by the two pressure sensors 6 and 7 is output to the electronic control device 90.

The first pressure sensor 6 is disposed on the upstream side from the first changeover valve 51, and detects the brake hydraulic pressure generated by the master cylinder 10.

The second pressure sensor 7 is disposed on the downstream side from the second changeover valve 52. When the two connection passages 5*a* and 5*b* and the downstream sides of the two main hydraulic passages 2*a* and 2*b* are connected, the second pressure sensor detects the brake hydraulic pressure generated by the slave cylinder 20.

A supply passage 73 for the slave cylinder is a fluid passage extending from the reservoir tank 80 to the slave cylinder 20. Also, the supply passage 73 for the slave cylinder is connected to the common hydraulic passage 4 by a branch supply passage 73*a*.

On the branch supply passage 73*a*, a check valve 75 is provided to allow only a flow of the brake fluid from the reservoir tank 80 toward the common hydraulic passage 4.

Normally, the brake fluid is supplied from the reservoir tank 80 to the slave cylinder 20 through the supply passage 73 for the slave cylinder.

Also, during fluid suction control, the brake fluid is sucked from the reservoir tank 80 into the slave cylinder 20 through the supply passage 73 for the slave cylinder, the branch supply passage 73*a*, and the common hydraulic passage 4.

A return fluid passage 74 is a fluid passage extending from the hydraulic pressure control device 30 to the reservoir tank 80. The brake fluid released from the wheel cylinders W flows into the return fluid passage 74 through the hydraulic pressure control device 30. The brake fluid released into the return fluid passage 74 returns to the reservoir tank 80 through the return fluid passage 74.

The hydraulic pressure control device 30 is for appropriately controlling the hydraulic pressure of the brake fluid to act on the wheel cylinders W of the wheel brakes BR. The hydraulic pressure control device 30 has a configuration capable of performing antilock brake control. The wheel cylinders W are connected to outlet ports 301 of the base body 100 by pipes, respectively.

The hydraulic pressure control device 30 can increase, hold, or decrease the hydraulic pressure (hereinafter, referred to as the "wheel cylinder pressure") to act on the wheel cylinders W. The hydraulic pressure control device 30 includes inlet valves 31, outlet valves 32, and check valves 33.

The inlet valves 31 are disposed on two hydraulic passages extending from the first main hydraulic passage 2*a* to two wheel brakes BR and BR and two hydraulic passages extending from the second main hydraulic passage 2b to two wheel brakes BR and BR, on a one-to-one basis, respectively.

The inlet valves 31 are normally opened type proportional solenoid valves (linear solenoid valves), and are valves configured such that it is possible to adjust valve opening pressures of the inlet valves 31 according to the values of currents flowing in coils of the inlet valves 31.

Normally, since the inlet valves 31 are open, they allow the hydraulic pressure to be applied from the slave cylinder 20 to the wheel cylinders W. Also, when the wheels are about to be locked, the inlet valves 31 are closed by control of the electronic control device 90, whereby application of the hydraulic pressure to the wheel cylinders W is interrupted.

The outlet valves 32 are normally closed type solenoid valves disposed between the wheel cylinders W and the return fluid passage 74.

Although the outlet valves 32 are normally closed, when the wheels are about to be locked, the outlet valves are opened by control of the electronic control device 90.

The check valves 33 are connected in parallel to the inlet valves 31, respectively. The check valves 33 are valves allowing only flows of the brake fluid from the wheel cylinders W toward the slave cylinder 20 (the master cylinder 10). Therefore, even when the inlet valves 31 are closed, the check valves 33 allow flows of the brake fluid from the wheel cylinders W toward the slave cylinder 20.

The electronic control device 90 includes a housing 91 which is a resin box, and a control board 94 (see FIG. 10) contained in the housing 91. As shown in FIG. 2, the housing 91 is attached to a right surface 101d of the base body 100.

As shown in FIG. 1, the electronic control device 90 controls an operation of the motor 24 and opening and closing of each valve, on the basis of information acquired from various sensors such as the two pressure sensors 6 and 7 and a stroke sensor 77 (see FIG. 8), programs stored in advance, and so on.

Now, an operation of the brake system A for a vehicle will be described in brief.

In the brake system A for a vehicle shown in FIG. 1, if the system is activated, the two changeover valves 51 and 52 are excited, thereby being switched from the first positions to the second positions.

As a result, the downstream side of the first main hydraulic passage 2a is connected to the first connection passage 5a, and the downstream side of the second main hydraulic passage 2b is connected to the second connection passage 5b. Therefore, the master cylinder 10 and the wheel cylinders W are disconnected, and the slave cylinder 20 and the wheel cylinders W are connected.

Also, if the system is activated, the normally closed type solenoid valve 8 of the hydraulic branch passage 3 is opened. As a result, the hydraulic pressure generated by the master cylinder 10 in response to an operation on the brake pedal P is transmitted to the stroke simulator 40, without being transmitted to the wheel cylinders W.

Therefore, the hydraulic pressure of the pressure chamber 45 of the stroke simulator 40 increases, whereby the third piston 42 moves toward the lid member 44 against the biasing forces of the coil springs 43a and 43b. In this way, a stroke on the brake pedal P is allowed, and a pseudo operation reaction force is applied to the brake pedal P.

Also, if the stroke sensor 77 (FIG. 8) detects depression of the brake pedal P, the electronic control device 90 drives the motor 24 of the slave cylinder 20, whereby the second piston 22 of the slave cylinder 20 moves toward the bottom surface 21a. As a result, the brake fluid contained in the pressure chamber 26 is pressed.

The electronic control device 90 compares the hydraulic pressure generated by the slave cylinder 20 (the hydraulic pressure detected by the second pressure sensor 7) with a requirement hydraulic pressure corresponding to the amount of operation on the brake pedal P, and controls the rotation speed of the motor 24 on the basis of the comparison result.

In this way, the brake system A for a vehicle increases the hydraulic pressure in response to the amount of operation on the brake pedal P. Also, the hydraulic pressure generated by the slave cylinder 20 is applied to the hydraulic pressure control device 30.

If depression of the brake pedal P is released, the electronic control device 90 reversely rotates the motor 24 of the slave cylinder 20, whereby the second piston 22 is moved back toward the motor 24 by the coil spring 23. As a result, the internal pressure of the pressure chamber 26 decreases.

Also, in a case where a detection value of the second pressure sensor 7 does not increase to a determination value although the motor 24 of the slave cylinder 20 rotates, the electronic control device 90 closes the two shutoff valves 61 and 62, and drives the slave cylinder 20 such that the slave cylinder 20 increases the hydraulic pressure.

Even then, if the detection value of the second pressure sensor 7 does not increase, since there is a possibility that the brake fluid is leaking from any passage positioned on the slave cylinder 20, the electronic control device 90 controls the individual valves such that the hydraulic pressure directly acts from the master cylinder 10 on the wheel cylinders W.

Also, when the two shutoff valves 61 and 62 are closed, and the slave cylinder 20 operates to increase the hydraulic pressure, if the detection value of the second pressure sensor 7 increases, the electronic control device 90 closes the first shutoff valve 61, and opens the second shutoff valve 62, and drives the slave cylinder 20 such that the slave cylinder increases the hydraulic pressure.

As a result, if the detection value of the second pressure sensor 7 increases, since there is a possibility that the brake fluid would be leaking from the first main hydraulic passage 2a, the electronic control device 90 keeps on driving the slave cylinder 20 such that the hydraulic pressure in the second main hydraulic passage 2b increases.

Meanwhile, even if the first shutoff valve 61 is closed and the second shutoff valve 62 is opened and the slave cylinder 20 operates to increase the hydraulic pressure, if the detection value of the second pressure sensor 7 does not increase, the electronic control device 90 opens the first shutoff valve 61, and closes the second shutoff valve 62, and drives the slave cylinder 20 such that the hydraulic pressure increases.

As a result, in a case where the detection value of the second pressure sensor 7 increases, since there is a possibility that the brake fluid is leaking from the second main hydraulic passage 2b, the electronic control device 90 keeps on driving the slave cylinder 20 such that the hydraulic pressure in the first main hydraulic passage 2a increases.

In the hydraulic pressure control device 30, the electronic control device 90 controls the open/closed states of the inlet valves 31 and the outlet valves 32, whereby the wheel cylinder pressure of the wheel cylinders W are adjusted.

For example, in a normal state in which the inlet valves 31 are open and the outlet valves 32 are closed, if the brake pedal P is depressed, the hydraulic pressure generated by the slave cylinder 20 is transmitted to the wheel cylinders W without change, whereby the wheel cylinder pressure increases.

Meanwhile, in a state in which the inlet valves 31 are closed and the outlet valves 32 are open, the brake fluid flows from the wheel cylinders W toward the return fluid passage 74, whereby the wheel cylinder pressure decreases, whereby the hydraulic pressure decreases.

Also, in a state in which all of the inlet valves 31 and the outlet valves 32 are closed, the wheel cylinder pressure is held.

Also, in a state where the slave cylinder 20 does not operate (for example, in a case where an ignition is in an OFF state or electric power is not supplied), the first changeover valve 51, the second changeover valve 52, and the normally closed type solenoid valve 8 return to their initial states. As a result, the upstream side and downstream side of each of the main hydraulic passages 2a and 2b are connected. In this state, the hydraulic pressure generated by the master cylinder 10 is transmitted to the wheel cylinders W through the hydraulic pressure control device 30.

Now, the arrangement of the master cylinder 10, the slave cylinder 20, the stroke simulator 40, the hydraulic pressure control device 30, and the electronic control device 90 included in the hydraulic pressure generating device 1 will be described.

Also, in the following description, the arrangement of those devices in a state where the hydraulic pressure generating device 1 is mounted on a vehicle will be described.

An upper portion 101 of the base body 100 is formed substantially in a cuboid shape as shown in FIGS. 2 and 3. In the upper portion 10, the first cylinder bore 11 and the third cylinder bore 41 are formed as shown in FIG. 7. On the upper surface 101e of the upper portion 101, the reservoir tank 80 is attached as shown in FIG. 2.

Figure 5:
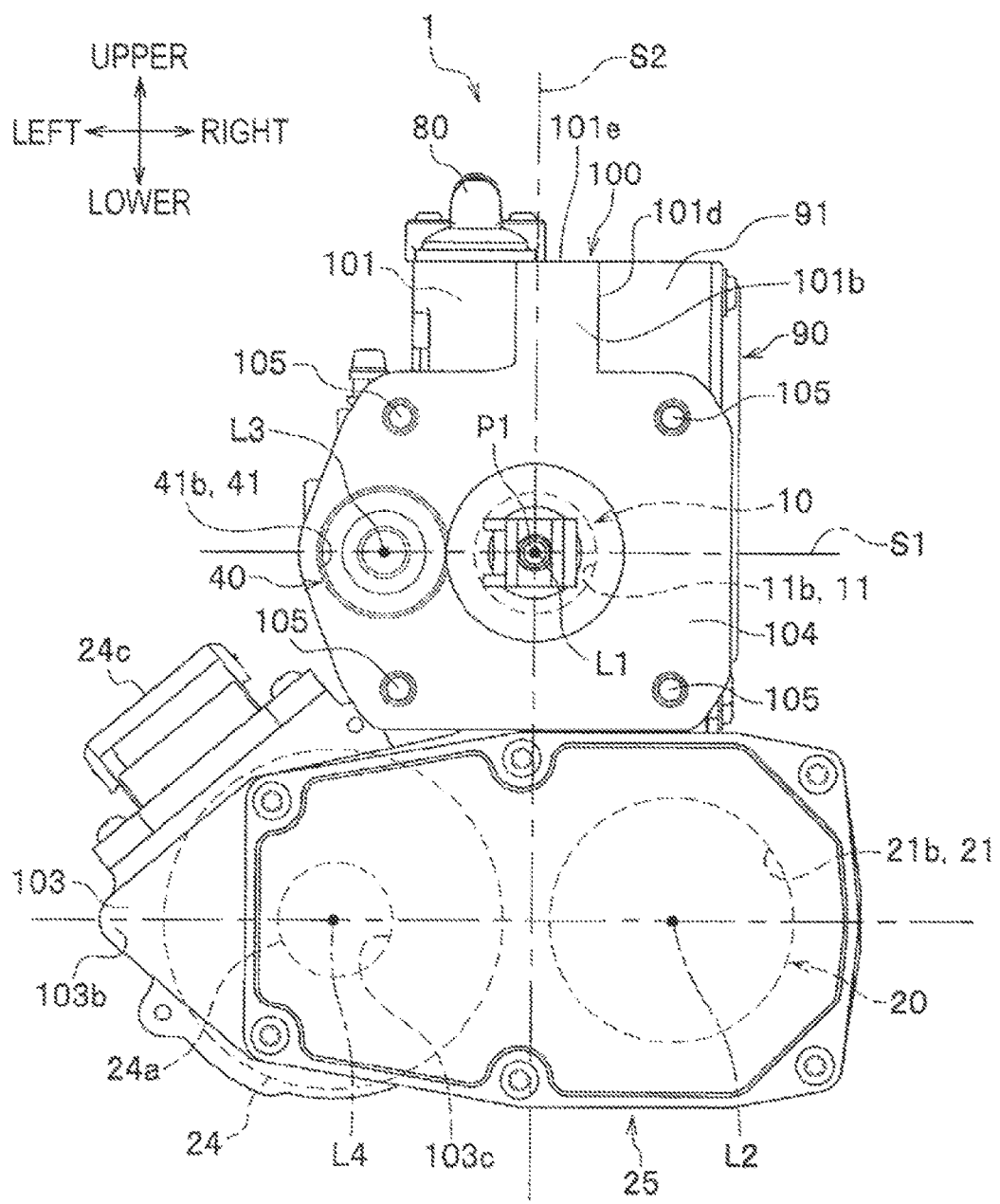
FIG. 5 is a front view illustrating the hydraulic pressure generating device of the embodiment.
Figure 6:
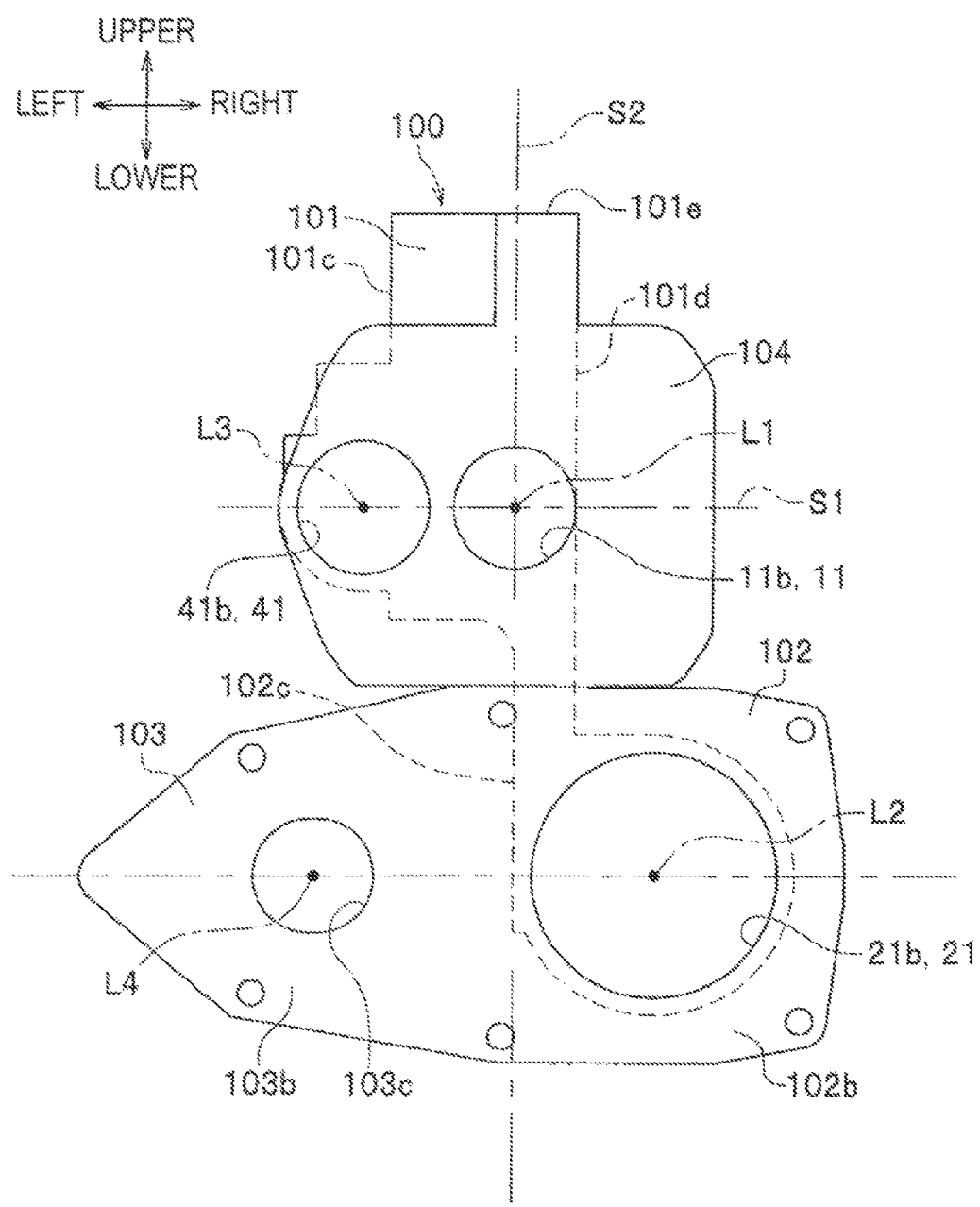
FIG. 6 is a front view illustrating a base body of the hydraulic pressure generating device of the embodiment.

At the central portion of the upper portion 101 of the base body 100 in a vertical direction and the left-right direction, as shown in FIG. 5, the first cylinder bore 11 of the master cylinder 10 is formed (see FIG. 6).

The first cylinder bore 11 is a cylindrical bore with a bottom. The axial line L1 of the first cylinder bore 11 extends in the front-rear direction as shown in FIG. 7. The rear end portion of the first cylinder bore 11 is formed in the rear surface 101b of the upper portion 101. In other words, the first cylinder bore 11 is open toward the rear side.

The rear surface 101b of the upper portion 101 of the base body 100 has a vehicle contact surface 104 as shown in FIG. 4. The vehicle contact surface 104 is a portion to be attached to the front surface of a dashboard B partitioning an engine room and the interior of the vehicle.

At the central portion of the vehicle contact surface 104, the opening 11b of the first cylinder bore 11 is formed as shown in FIG. 5. Also, from four corners of the vehicle contact surface 104, that is, the upper, lower, left, and right thereof, four stud bolts 105 protrude.

When the base body 100 is attached to the dashboard B, as shown in FIG. 4, the stud bolts 105 are inserted from the engine side (the left side of FIG. 4) into mounting holes (not shown in the drawings) of the dashboard B. Further, inside the vehicle (the right side of FIG. 4), the leading end portions of the stud bolts 105 are attached to the vehicle frame (not shown in the drawings). In this way, it is possible to fix the base body 100 to the front surface of the dashboard B.

In a portion of the upper portion 101 of the base body 100 positioned on the left side from the first cylinder bore 11, as shown in FIG. 5, the third cylinder bore 41 of the stroke simulator 40 is formed (see FIG. 6).

The third cylinder bore 41 is a cylindrical bore with a bottom. As shown in FIG. 7, the axial line L3 of the third cylinder bore 41 extends in the front-rear direction.

The axial line L3 of the third cylinder bore 41 is parallel to the axial line L1 of the first cylinder bore 11. Like this, the first cylinder bore 11 and the third cylinder bore 41 are disposed side by side in parallel.

As shown in FIG. 6, the axial line L3 of the third cylinder bore 41 and the axial line L1 of the first cylinder bore 11 are arranged side by side in the left-right direction on a horizontal reference plane S1 (a virtual plane).

The third cylinder bore 41 is formed in the rear surface 101b of the upper portion 101 of the base body 100. In other words, the third cylinder bore 41 is open toward the rear side.

An almost half left portion of the peripheral wall portion of the third cylinder bore 41 protrudes from a left surface 101c of the upper portion 101 toward the left side as shown in FIG. 3.

As shown in FIG. 6, a lower portion 102 of the base body 100 is formed to be connected to the upper portion 101 and protrude toward the right side from the right surface 101d of the upper portion 101. Also, the left surface 101c of the lower portion 102 is positioned on the right side from the left surface 101c of the upper portion 101 with an offset.

The rear surface 102b of the lower portion 102 is positioned on the front side from the rear surface 101b (the vehicle contact surface 104) of the upper portion 101 with an offset as shown in FIG. 7. Also, a front portion 102a of the lower portion 102 protrudes from a front surface 101a of the upper portion 101 toward the front side.

In the lower portion 102 of the base body 100, as shown in FIG. 5, the second cylinder bore 21 of the slave cylinder 20 is formed (see FIG. 6).

The second cylinder bore 21 is a cylindrical bore with a bottom. As shown in FIG. 7, the axial line L2 of the second cylinder bore 21 extends in the front-rear direction.

As shown in FIG. 6, the second cylinder bore 21 is disposed on the lower side from the first cylinder bore 11 and the third cylinder bore 41, and the second cylinder bore 21 is disposed on the diagonally right lower side.

As shown in FIG. 7, the axial line L2 of the second cylinder bore 21 is parallel to the axial line L1 of the first cylinder bore 11 and the axial line L3 of the third cylinder bore 41. Like this, the first cylinder bore 11, the second cylinder bore 21, and the third pattern area 23 are arranged side by side in parallel.

The second cylinder bore 21 is formed in the rear surface 102b of the lower portion 102 of the base body 100. In other words, the second cylinder bore 21 is open toward the rear side.

In the rear end portion of the lower portion 102 of the base body 100, as shown in FIG. 6, the flange portion 103 is formed so as to protrude toward the left side. The flange portion 103 is a plate-like portion perpendicularly protruding from a left surface 102c of the lower portion 102.

As shown in FIG. 4, the front surface of the flange portion 103 is a motor mounting surface 103a for mounting the motor 24. Also, the rear surface of the flange portion 103 is a drive-transmission-unit mounting surface 103b for mounting the drive transmission unit 25.

The drive-transmission-unit mounting surface 103b of the flange portion 103 is formed so as to be connected to the rear surface 102b of the lower portion 102 on the same plane. Further, similarly to the rear surface 102b of the lower portion 102, the drive-transmission-unit mounting surface 103b is disposed on the front side from the rear surface 101b of the upper portion 101 with an offset. In other words, the drive-transmission-unit mounting surface 103b is disposed on the front side from the vehicle contact surface 104 of the upper portion 101.

On the motor mounting surface 103a of the flange portion 103, the motor 24 is attached. The front end surface of the motor 24 is disposed on the rear side from the front surface 101a of the upper portion 101 of the base body 100. The motor 24 is disposed at a position close to the center of the base body 100 in the front-rear direction and the left-right direction.

In the flange portion 103, an insertion hole 103c is formed in the front-rear direction. The output shaft 24a protruding from the rear surface of the motor 24 toward the rear side is inserted into the insertion hole 103c so as to protrude from the drive-transmission-unit mounting surface 103b toward the rear side through the insertion hole 103c.

As shown in FIG. 6, the insertion hole 103c of the flange portion 103 is disposed on the lower side from the first cylinder bore 11 and the third cylinder bore 41 and on the diagonally left lower side from the first cylinder bore 11.

Therefore, if the motor 24 is attached to the flange portion 103, as shown in FIG. 5, the output shaft 24a is disposed on the lower side from the first cylinder bore 11 and the third cylinder bore 41 and on the diagonally left lower side from the first cylinder bore 11.

In a state where the motor 24 is mounted on the flange portion 103, as shown in FIG. 4, an axial line L4 of the output shaft 24a extends in the front-rear direction.

The axial line L4 of the output shaft 24a is parallel to the axial lines L1, L2, and L3 of the cylinder bores 11, 21, and 41. Like this, the cylinder bores 11, 21, and 41 and the output shaft 24a are disposed side by side in parallel.

Also, as shown in FIG. 5, the axial line L4 of the output shaft 24a and the axial line L2 of the second cylinder bore 21 are disposed side by side in the left-right direction.

As shown in FIG. 1, on the rear surface 102b of the lower portion 102 of the base body 100 and the drive-transmission-unit mounting surface 103b of the flange portion 103, components of the drive transmission unit 25 are assembled.

As shown in FIG. 4, the offsets of the rear surface 102b of the lower portion 102 and from the drive-transmission-unit mounting surface 103b of the flange portion 103 from the vehicle contact surface 104 toward the front side are set such that the rear end portion of the cover member 25e of the drive transmission unit 25 does not protrude from the vehicle contact surface 104 of the upper portion 101 toward the rear side.

Therefore, when the vehicle contact surface 104 of the base body 100 is mounted on the dashboard B, the drive transmission unit 25 is positioned between the front surface of the dashboard B and the drive-transmission-unit mounting surface 103b of the flange portion 103 of the base body 100.

In the right surface 101d of the upper portion 101 of the base body 100, as shown in FIG. 7, a plurality of mounting holes 110 for mounting the various solenoid valves 51, 52, 61, 62, 8, 31, and 32 (see FIG. 1) and the two pressure sensors 6 and 7 (see FIG. 1) is formed. However, FIG. 7 schematically shows the positions and sizes of the mounting holes 110.

On the right surface 101d of the upper portion 101, the housing 91 of the electronic control device 90 is attached as shown in FIG. 2. The various solenoid valves 51, 52, 61, 62, 8, 31, and 32 (see FIG. 1) and the two pressure sensors 6 and 7 (see FIG. 1) mounted in the mounting holes 110 (see FIG. 7) are covered by the housing 91.

The housing 91 is disposed on the second cylinder bore 21. Like this, the housing 91 and the slave cylinder 20 are disposed on the right side of the upper portion 101 of the base body 100, side by side in the vertical direction (see FIG. 5).

As shown in FIG. 3, the front end portion of the housing 91 protrudes toward the front side from the front surface 101a of the upper portion 101 of the base body 100. On the right surface of the front portion of the housing 91, an external connection connector 92 and a motor connection connector 93 are provided.

The external connection connector 92 is a part to be connected with a connector provided at an end portion of an external wiring cable (not shown in the drawings). The external connection connector 92 extends toward the front side from the front surface 101a of the upper portion 101.

The motor connection connector 93 is disposed below the external connection connector 92. The motor connection connector 93 is a part to be connected with a motor connector 24c of the motor 24 by a cable (not shown in the drawings).

In the hydraulic pressure generating device 1 of the present embodiment, as shown in FIG. 5, the second cylinder bore 21 and the motor 24 (the output shaft 24a) are disposed below the horizontal reference plane S1 (the virtual plane) including the axial line L1 of the first cylinder bore 11 and the axial line L3 of the third cylinder bore 41.

Also, the third cylinder bore 41 and the motor 24 (the output shaft 24a) are disposed on the left side from a vertical reference plane S2 (a virtual plane) including the axial line L1 of the first cylinder bore 11. Further, the second cylinder bore 21 is disposed on the right side from the vertical reference plane S2 including the axial line L1 of the first cylinder bore 11.

As described above, in the hydraulic pressure generating device 1, below the first cylinder bore 11, the second cylinder bore 21 and the motor 24 are disposed on the right and left of the vertical reference plane S2 including the axial line L1 of the first cylinder bore 11, respectively.

Therefore, as the hydraulic pressure generating device 1 is seen from the front-rear direction, the center point of the first cylinder bore 11 (the axial line L1), the center point of the second cylinder bore 21 (the axial line L2), and the center point of the output shaft 24a (the axial line L4) are disposed such that a line connecting them forms a triangle. In other words, as the hydraulic pressure generating device 1 is seen from the front-rear direction, the first cylinder bore 11 (the master cylinder 10) is disposed at the apex of the triangle, and the second cylinder bore 21 (the slave cylinder 20) and the output shaft 24a (the motor 24) are disposed at the left and right ends of the base of the triangle.

In the hydraulic pressure generating device 1 configured as described above, as shown in FIG. 4, the axial lines L1, L2, and L3 of the cylinder bores 11, 21, and 41 and the axial line L4 of the output shaft 24a of the motor 24 are disposed in parallel, such that the cylinder bores 11, 21, and 41 and the motor 24 are disposed with good balance. As a result, the size of the hydraulic pressure generating device 1 decreases.

In the hydraulic pressure generating device 1 of the present embodiment, as shown in FIG. 5, the slave cylinder 20 and the motor 24 are disposed below the master cylinder 10, and the slave cylinder 20 and the motor 24 are disposed on the right and left of the master cylinder 10, respectively. Therefore, the gravity center of the hydraulic pressure generating device 1 is low. Especially, since the motor 24 is a heavy component, the motor is disposed at a lowest portion of the hydraulic pressure generating device 1, whereby it is possible to stabilize the weight balance of the master cylinder 10, the slave cylinder 20, and the motor 24, and it is possible to effectively improve the stability of the hydraulic pressure generating device 1.

In the hydraulic pressure generating device 1 of the present embodiment, the housing 91 and the slave cylinder 20 are disposed side by side in the vertical direction, and a space around the base body 100 is effectively used. Therefore, the hydraulic pressure generating device 1 has a smaller size.

In the hydraulic pressure generating device 1 of the present embodiment, since the first cylinder bore 11 and the third cylinder bore 41 are adjacent to each other in the left-right direction, it is easy to connect the master cylinder 10 to the stroke simulator 40. Also, since the master cylinder 10 and the stroke simulator 40 are disposed compactly, it is possible to further reduce the size of the hydraulic pressure generating device 1.

Now, the stroke sensor 77 of the present embodiment will be described.

Figure 8:
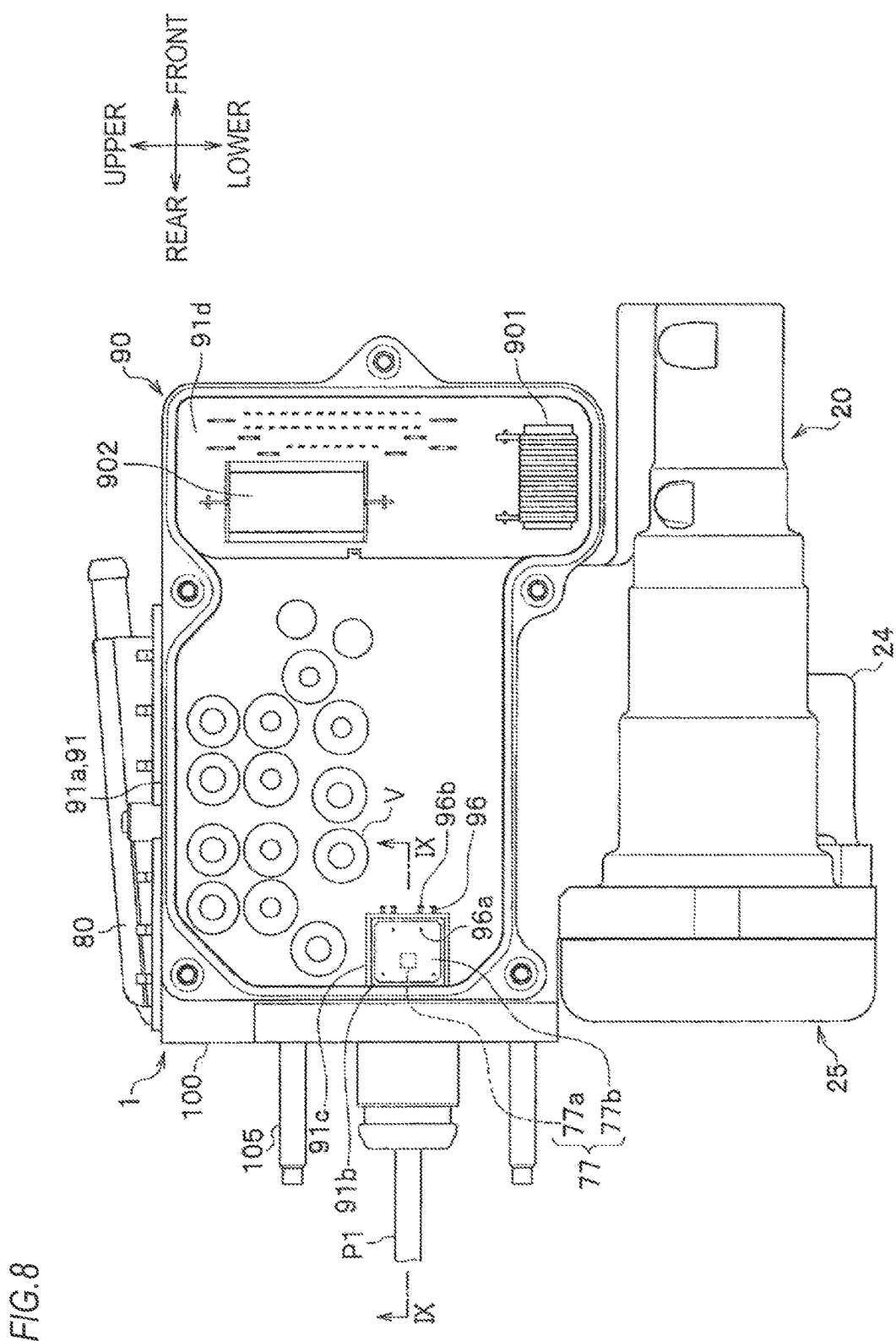
FIG. 8 is a right side view illustrating the hydraulic pressure generating device of the embodiment without a cover and a control board.
Figure 9:
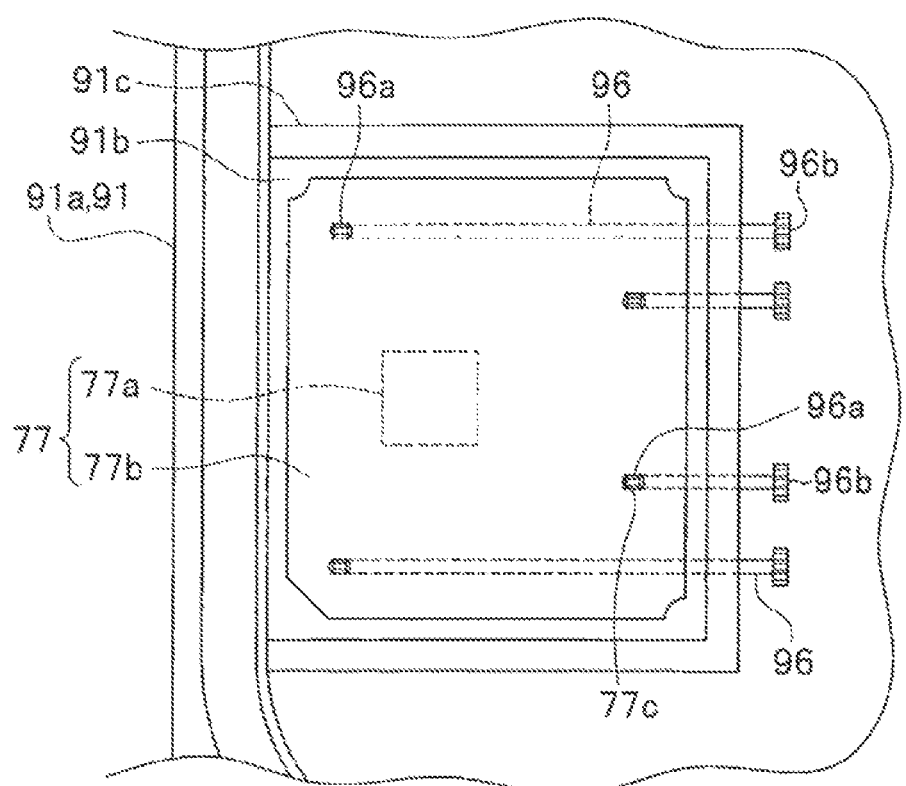
FIG. 9 is an enlarged view of a portion of FIG. 8 including a stroke sensor.
Figure 10:
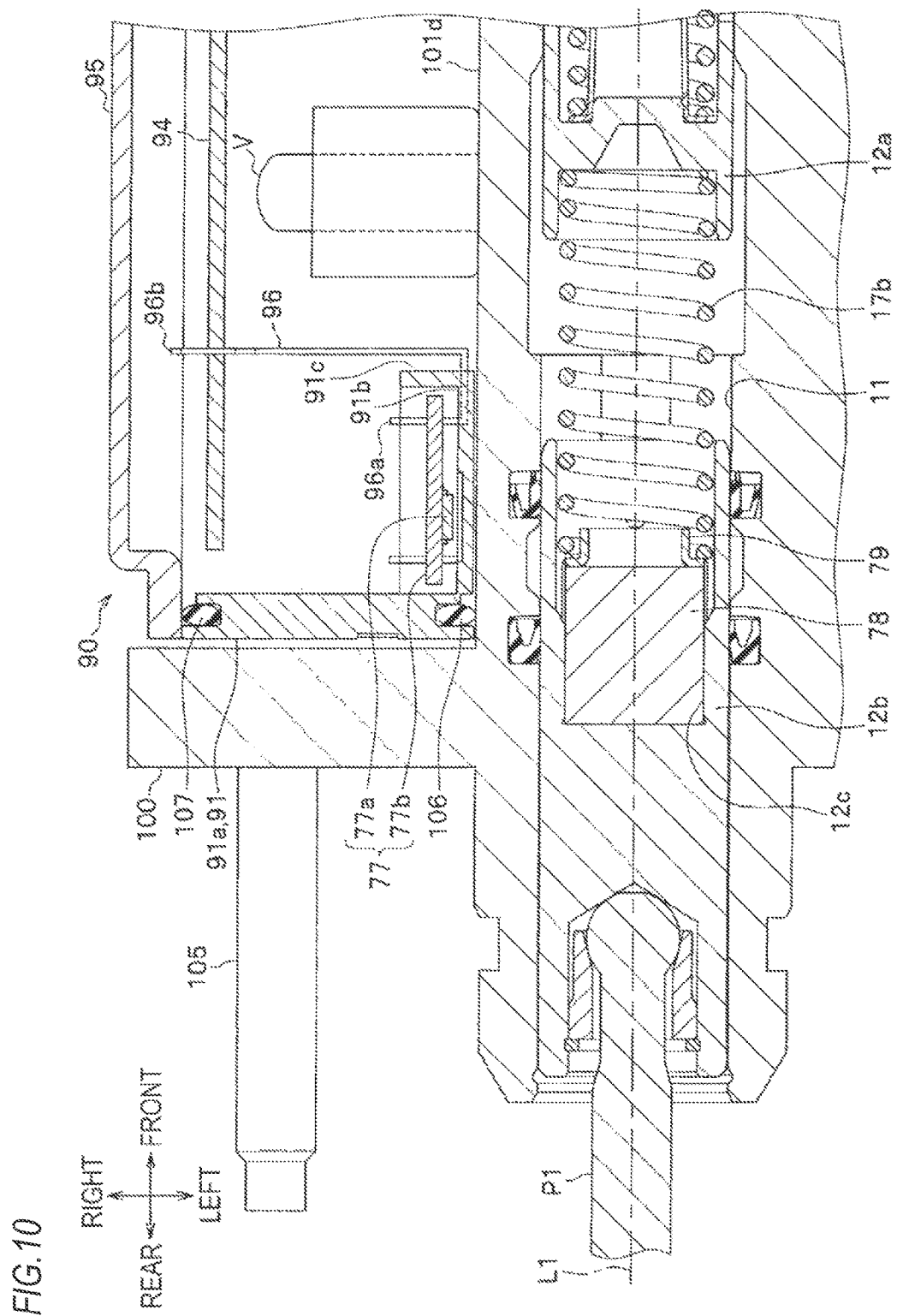
FIG. 10 is a cross-sectional view taken along a line IX-IX of FIG. 8.

FIG. 8 is a right side view illustrating the hydraulic pressure generating device 1 without a cover 95 and the control board 94. FIG. 9 is an enlarged view of a portion of FIG. 8 including the stroke sensor 77. FIG. 10 is a cross-sectional view taken along a line IX-IX of FIG. 8. However, in FIG. 10, the cover 95 and the control board 94 are also shown.

As shown in FIG. 10, the housing 91 is attached to the right surface 101d of the base body 100 with a sealing member 106 interposed therebetween. The housing 91 has a peripheral wall portion 91a which surrounds various components such as the control board 94 functioning as the electronic control device 90 and the solenoid valves V (a general term for the valves 51, 52, 61, 62, 8, 31, and 32 (see FIG. 1)).

On the right edge of an opening of the peripheral wall portion 91a, the cover 95 is attached with a sealing member 107 interposed therebetween. The cover 95 is made of a metal member, for example, an aluminum member.

As shown in FIG. 8, the inner surface of the front side of the peripheral wall portion 91a is connected to a mounting wall portion 91d, and on the mounting wall portion 91d, various components such as a noise removal coil 901 and a capacitor 902 are attached.

As shown in FIG. 10, on the front side of the first piston 12b, a hole 12c is formed. Inside the hole 12c, a magnet 78 is contained as a detection object member. The magnet 78 has a columnar shape. However, the present invention is not limited thereto. For example, the magnet may have a cylindrical shape. The magnet 78 is pushed toward the rear side by the coil spring 17b, with a retainer interposed therebetween. In other words, the magnet 78 is held inside the hole 12c. Therefore, as the first piston 12b slides, the magnet 78 moves in the front-rear direction along the axial line L1 of the first cylinder bore 11.

As shown in FIGS. 8 to 10, the inner surface of the rear side of the peripheral wall portion 91a of the housing 91 is connected to a facing wall portion 91b formed in parallel to the right surface 101d of the base body 100. The facing wall portion 91b faces the right surface 101d of the base body 100.

In order to bring the left edge of the opening of the peripheral wall portion 91a into close contact with the right surface 101d of the base body 100, it is preferable to form a slight gap between the facing wall portion 91b and the right surface 101d. However, the facing wall portion 91b may be in contact with the right surface 101d. Alternatively, the facing wall portion 91b and the right surface 101d may be separated as long as the stroke sensor 77 can detect the magnet 78.

The stroke sensor 77 is installed inside the housing 91. Between the stroke sensor 77 and the base body 100, the facing wall portion 91b is disposed. Further, the stroke sensor 77 is electrically connected to the control board 94. Also, from the facing wall portion 91b, a surrounding wall 91c for surrounding the stroke sensor 77 protrudes.

The stroke sensor 77 faces the magnet 78 with the facing wall portion 91b and the peripheral walls of the base body 100 and the first piston 12b interposed therebetween. The stroke sensor 77 is close to the right surface 101d of the base body 100, and is closest to the magnet 78 inside the housing 91. Therefore, the stroke sensor 77 has a shortest distance from the magnet 78 inside the housing 91.

This stroke sensor 77 detects a stroke for sliding the first piston 12b (the amount of movement of the first piston) by detecting the magnet 78. The amount of movement of the first piston 12b corresponds to the amount of operation on the brake pedal P. Specifically, if the magnet 78 moves along the axial line L1 in tandem with the rod P1 of the brake pedal P, the stroke sensor 77 detects change in magnetic field lines of the magnet 78.

Also, although the stroke sensor 77 partially faces the magnet 78 with the facing wall portion 91b and the peripheral walls of the base body 100 and the first piston 12b interposed therebetween (see FIG. 10), the present invention is not limited thereto. For example, when the brake pedal P is at its origin position, that is, when the master cylinder 10 is at its initial position, the stroke sensor 77 may not face the magnet 78 with the facing wall portion 91b and the like interposed therebetween.

The stroke sensor 77 includes a detection element 77a for detecting the magnet 78, and a sensor board 77b having the detection element 77a thereon. As the detection element 77a, for example, a Hall IC can be used.

In the housing 91, a plurality of (in the present embodiment, four) bus bars 96 is installed as conductive members for connecting the sensor board 77b and the control board 94 (see FIG. 9). A portion of each bus bar 96 is buried in the facing wall portion 91b of the housing 91. In other words, the housing 91 is formed integrally with the bus bars 96.

Both end portions of each bus bar 96 have male terminals 96a and 96b, respectively. The male terminals 96a provided at the end portions of the bus bars 96 positioned close to the sensor board 77b are inserted into female terminals 77c (see FIG. 9) provided on the sensor board 77b by pressing (for example, press fitting). The sensor board 77b is fixed to the male terminals 96a. Meanwhile, the male terminals 96b provided at the end portions of the bus bars 96 positioned close to the control board 94 are inserted into female terminals provided on the control board 94. The control board 94 is fixed to the male terminals 96b.

On the right surface 101d of the base body 100, the plurality of solenoid valves V and the housing 91 are attached. The extension direction of the male terminals 96a of the bus bars 96 positioned close to the sensor board 77b is parallel to the central axes of the solenoid valves V. Also, the male terminals 96a of the bus bars 96 positioned close to the sensor board 77b extend in a direction from the base body 100 toward the control board 94, and are connected to the female terminals 77c of the sensor board 77b.

The male terminals 96a of the plurality of bus bars 96 are distributed substantially uniformly around the sensor board 77b. Therefore, the sensor board 77b is stably held by the plurality of male terminals 96a.

As described above, in the hydraulic pressure generating device 1 of the present embodiment, the stroke sensor 77 is installed inside the housing 91 on the opposite side of the facing wall portion 91b to the base body 100, and is electrically connected to the control board 94. Therefore, an input attributable to an operator's operation on the brake can be detected by the stroke sensor 77 contained in the housing 91. Also, a signal detected by the stroke sensor 77 is input directly to the control board 94. As described above, the stroke sensor 77 is contained in the housing 91 attached to the base body 100. Therefore, it becomes possible to reduce the size of the base body 100 even though the stroke sensor 77 is included, and it is possible to achieve an advantage that it is easy to secure a space for mounting the hydraulic pressure generating device on a vehicle.

Also, a portion of the stroke sensor 77 positioned close to the base body 100 is covered by the facing wall portion 91b. Therefore, for example, during maintenance, when a worker attaches or detaches the housing 91 to or from the base body 100, it is possible to suppress the fingers of the worker from touching the stroke sensor 77, other components, and so on. Further, it is possible to suppress entry of external foreign materials by the facing wall portion 91b, and it is possible to provide a dust proofing function. Since the stroke sensor 77 is protected by the facing wall portion 91b as described above, it is possible to secure detection accuracy and durability, and it is possible to improve reliability.

In other words, according to the present embodiment, it is possible to provide the hydraulic pressure generating device 1 making it easier to secure a space for mounting the hydraulic pressure generating device on a vehicle and capable of protecting the stroke sensor 77.

Further, since the hydraulic pressure generating device 1 includes the stroke sensor 77, as compared to a case where the stroke sensor 77 is configured separately from the hydraulic pressure generating device 1, it is unnecessary to separately provide the stroke sensor 77 and form signal lines. For this reason, assembling man-hours when the hydraulic pressure generating device 1 is mounted on a vehicle decrease, and the number of components decreases. Therefore, it is possible to reduce the manufacturing cost.

Also, in the present embodiment, the sensor board 77b is fixed to the bus bars 96. According to this configuration, since the sensor board 77b is fixed by the bus bars 96, the stroke sensor 77 does not need to be contained, for example, inside a resin mold component, and also does not need connectors for connection. Therefore, the configuration of the stroke sensor 77 is simplified, and the cost decreases.

Also, in the present embodiment, in a state where the male terminals 96a of the bus bars 96 are inserted in the female terminals 77c provided on the sensor board 77b, the sensor board 77b is fixed to the bus bars 96. According to this configuration, since the male terminals 96a are inserted into the female terminals 77c, it is possible to fix the sensor board 77b by pressing (for example, press fitting).

However, male terminals provided on the sensor board 77b may be inserted into female terminals provided at the end portions of the bus bars 96 positioned close to the sensor board 77b.

Also, in the present embodiment, a portion of each bus bar 96 is buried in the facing wall portion 91b of the housing 91. Therefore, it is possible to stably and securely fix the bus bars 96 to the housing 91 by the facing wall portion 91b. As a result, the male terminals 96a provided at the end portions of the bus bars 96 are precisely positioned. Therefore, it becomes easier to connect the sensor board 77b to the male terminals 96a of the bus bars 96, and the electrical connection of the bus bars 96 with the sensor board 77b becomes securer.

Also, in the present embodiment, the extension direction of the male terminals 96a of the bus bars 96 is disposed in parallel to the central axes of the solenoid valves V. Therefore, it is possible to move the sensor board 77b of the stroke sensor 77 in the same direction as the direction in which the solenoid valves V are attached to the base body 100, and connect the sensor board to the male terminals 96a of the bus bars 96. Therefore, it is possible to efficiently install the stroke sensor 77.

Also, in the present embodiment, the male terminals 96a of the bus bars 96 extend in the direction from the base body 100 toward the control board 94, and are connected to the female terminals of the sensor board 77b. For this reason, it is possible to move the sensor board 77b of the stroke sensor 77 in the same direction as the direction in which the control board 94 is attached to the inside of the housing 91, and connect the sensor board to the male terminals 96a of the bus bars 96. Therefore, it is possible to efficiently install the stroke sensor 77.

Also, in the present embodiment, the housing 91 has the surrounding wall 91c protruding from the facing wall portion 91b and surrounding the stroke sensor 77. According to this configuration, the stroke sensor 77 is covered and protected by the facing wall portion 91b and the surrounding wall 91c. Therefore, it is possible to further improve the reliability of the stroke sensor 77.

Although the present invention has been described above on the basis of the embodiment, the present invention is not limited to the components described with respect to the embodiment, and it is possible to appropriately modify the components without departing from the gist of the present invention. Also, with respect to some of the components of the embodiment, it is possible to make additions, omissions, and replacements.

For example, the stroke sensor 77 may be fixed to the housing 91. According to this configuration, it is possible to securely prevent the stroke sensor 77 from unexpectedly moving. Therefore, it is possible to further improve the reliability of the stroke sensor 77.

In a case of fixing the stroke sensor 77 to the housing 91, the stroke sensor 77 may be buried in a resin fixed on the facing wall portion 91b of the housing 91. In this case, in a space surrounded by the facing wall portion 91b and the surrounding wall 91c, for example, a bonding adhesive composed of a resin material may be filled and hardened. According to this configuration, it is possible to easily and securely the stroke sensor 77 to the housing 91, and since the whole of the stroke sensor 77 is covered by the resin, the stroke sensor is more securely protected.

Also, in a case of fixing the stroke sensor 77 to the housing 91, for example, the sensor board 77b may be fastened to the housing 91 by screws. Also, the connection of the bus bars 96 and the sensor board 77b is not limited to press fitting. For example, they may be connected by wire bonding or the like.

Also, the second cylinder bore 21 and the output shaft 24a may be disposed above the first cylinder bore 11. Also, the motor 24 may be disposed such that the output shaft 24a protrudes from the motor 24 toward the front side. Also, the housing 91 may be disposed below the second cylinder bore 21. Also, the master cylinder 10 may be configured by a single piston type cylinder. Also, the slave cylinder 20 may be configured by a tandem piston type cylinder. Also, from among the master cylinder 10, the stroke simulator 40, the slave cylinder 20, and the hydraulic pressure control device 30, only two devices, that is, the master cylinder 10 and the slave cylinder 20 may be provided on the base body 100.

Also, in the above-described embodiment, the axial lines L1, L2, and L3 of the cylinder bores 11, 21, and 41 and the axial line L4 of the output shaft 24a of the motor 24 are disposed in parallel. However, the present invention is not limited thereto. For example, the axial lines L1, L2, L3, and L4 may be disposed in parallel. Here, when axial lines are referred to as being parallel to each other, the axial lines may be strictly parallel to each other, or the axial lines may be almost parallel to each other. Further, the present invention can be applied, for example, even to a case where the axial line L1 of the first cylinder bore 11 and the axial line L2 of the second cylinder bore 21 are perpendicular to each other.

The invention claimed is:

1. A hydraulic pressure generating device comprising:
    a base body;
    a master cylinder provided in the base body and configured to generate a brake hydraulic pressure by a first piston connected to a brake operating element;
    a housing attached to the base body;
    a control board contained in the housing;
    a stroke sensor configured to detect an amount of movement of the first piston; and
    a detection object member which is detected by the stroke sensor,
    wherein the housing comprises a facing wall portion provided so as to face the base body, and
    wherein the stroke sensor is provided inside the housing, on a side of the facing wall portion opposite to the base body, and is electrically connected to the control board,
    wherein a male terminal provided on one of the sensor board and an end portion of a conductive member positioned on a side of the sensor board is inserted in a female terminal provided on the other, the sensor board is fixed to the conductive member, and
    wherein a portion of the conductive member is buried in the facing wall portion of the housing.

2. The hydraulic pressure generating device according to claim 1,
    wherein the stroke sensor comprises a detection element configured to detect the detection object member, and the sensor board having the detection element thereon,
    wherein the housing is provided with the conductive member configured to connect the sensor board and the control board, and
    wherein the sensor board is fixed to the conductive member.

3. The hydraulic pressure generating device according to claim 2,
    wherein a plurality of solenoid valves is attached to a surface of the base body to which the housing is attached and
    wherein an extension direction of an end portion of a conduction member positioned on the sensor board side is disposed in parallel to central axes of the solenoid valves.

4. The hydraulic pressure generating device according to claim 2,
    wherein an end portion of the conductive member positioned on the sensor board side extends in a direction from the base body toward the control board and is connected to the sensor board.

5. The hydraulic pressure generating device claim 1,
    wherein the housing comprises a surrounding wall protruding from the facing wall portion and surrounding the stroke sensor.

6. The hydraulic pressure generating device according to claim 1,
    wherein the stroke sensor is fixed to the housing.

7. The hydraulic pressure generating device according to claim 6,
    wherein the stroke sensor is buried in a resin fixed on the facing wall portion of the housing.

8. The hydraulic pressure generating device according to claim 1 further comprising:
    a slave cylinder provided on the base body comprising a second piston,
    wherein the base body comprises a first cylinder bore with a bottom in which the first piston is inserted, and a second cylinder bore with a bottom in which the second piston is inserted, and
    wherein an axial line of the first cylinder bore and an axial line of the second cylinder bore are disposed in parallel.

9. The hydraulic pressure generating device according to claim 8 further comprising:
    a motor attached to the base body; and
    wherein the second cylinder bore is disposed below the first cylinder bore and the second cylinder bore and the motor are disposed to a left and right of a vertical reference plane including the axial line of the first cylinder bore.

10. The hydraulic pressure generating device according to claim 9,
    wherein the housing and the slave cylinder are disposed one above another with respect to a vertical direction.

11. The hydraulic pressure generating device according to claim 8,
    wherein the base body comprises a third cylinder bore with a bottom in which a third piston is inserted,
    wherein the third cylinder bore and the first cylinder bore are arranged side by side, and
    wherein an axial line of the third cylinder bore, the axial line of the first cylinder bore and the axial line of the second cylinder bore are disposed in parallel.

12. The hydraulic pressure generating device according to claim 11,
    wherein the second cylinder bore is disposed below the third cylinder bore and the first cylinder bore, and
    wherein the third cylinder bore is part of a stroke simulator.

13. The hydraulic pressure generating device according to claim 11,
    wherein the base body comprises an upper portion and a lower portion,
    wherein the first cylinder bore and the third cylinder bore are disclosed in the upper portion of the base body, and
    wherein the second cylinder bore is disposed in the lower portion.

14. The hydraulic pressure generating device according to claim 13, further comprising:
    a flange portion protruding from the lower portion of the base body; and
    an insertion hole disposed in the flange portion on a lower side of the lower portion with respect to the first cylinder bore and the third cylinder bore,
    wherein the flange portion is a plate perpendicularly protruding from a surface of the lower portion.

15. The hydraulic pressure generating device according to claim 14,
wherein an output shaft of a motor attached to the flange portion has an axial line in parallel with the axial lines of the first cylinder bore, the second cylinder bore and the third cylinder bore.

16. The hydraulic pressure generating device according to claim 13,
wherein the housing protrudes from a front surface of a front side of the upper portion of the base body and on a side of the second cylinder bore.

17. The hydraulic pressure generating device according to claim 13,
wherein the housing has a peripheral wall portion,
wherein an inner surface of the front side of the peripheral wall portion is connected to a mounting wall portion,
wherein the inner surface of a rear side of the peripheral wall portion of the housing is connected to the facing wall portion formed in parallel to a surface of the base body, with the facing wall portion facing the surface of the base body, and
wherein a gap is provided between the facing wall portion and the surface of the base body.

18. A hydraulic pressure generating device comprising:
a base body;
a master cylinder provided in the base body and configured to generate a brake hydraulic pressure by a first piston connected to a brake operating element;
a housing attached to the base body;
a control board contained in the housing;
a stroke sensor configured to detect an amount of movement of the first piston;
a detection object member which is detected by the stroke sensor,
wherein the housing comprises a facing wall portion provided so as to face the base body, and
wherein the stroke sensor is provided inside the housing, on a side of the facing wall portion opposite to the base body, and is electrically connected to the control board, and
further comprising:
a motor attached to the base body; and
a slave cylinder provided on the base body and using motor as a driving source and configured to generate a hydraulic pressure by a the second piston,
wherein the base body comprises a first cylinder bore with a bottom in which the first piston is inserted, and a second cylinder bore with a bottom in which the second piston is inserted,
wherein an axial line of the first cylinder bore, an axial line of the second cylinder bore, and an axial line of an output shaft of the motor are disposed in parallel,
wherein the second cylinder bore and the motor are disposed below the first cylinder bore and to a left and right of a vertical reference plane including the axial line of the first cylinder bore, and
wherein the housing and the slave cylinder are disposed one above another with respect to a vertical direction.

* * * * *